May 5, 1953     E. J. RYAN     2,637,688
METHOD OF POLYMERIZING OXYGEN
Filed Feb. 7, 1950
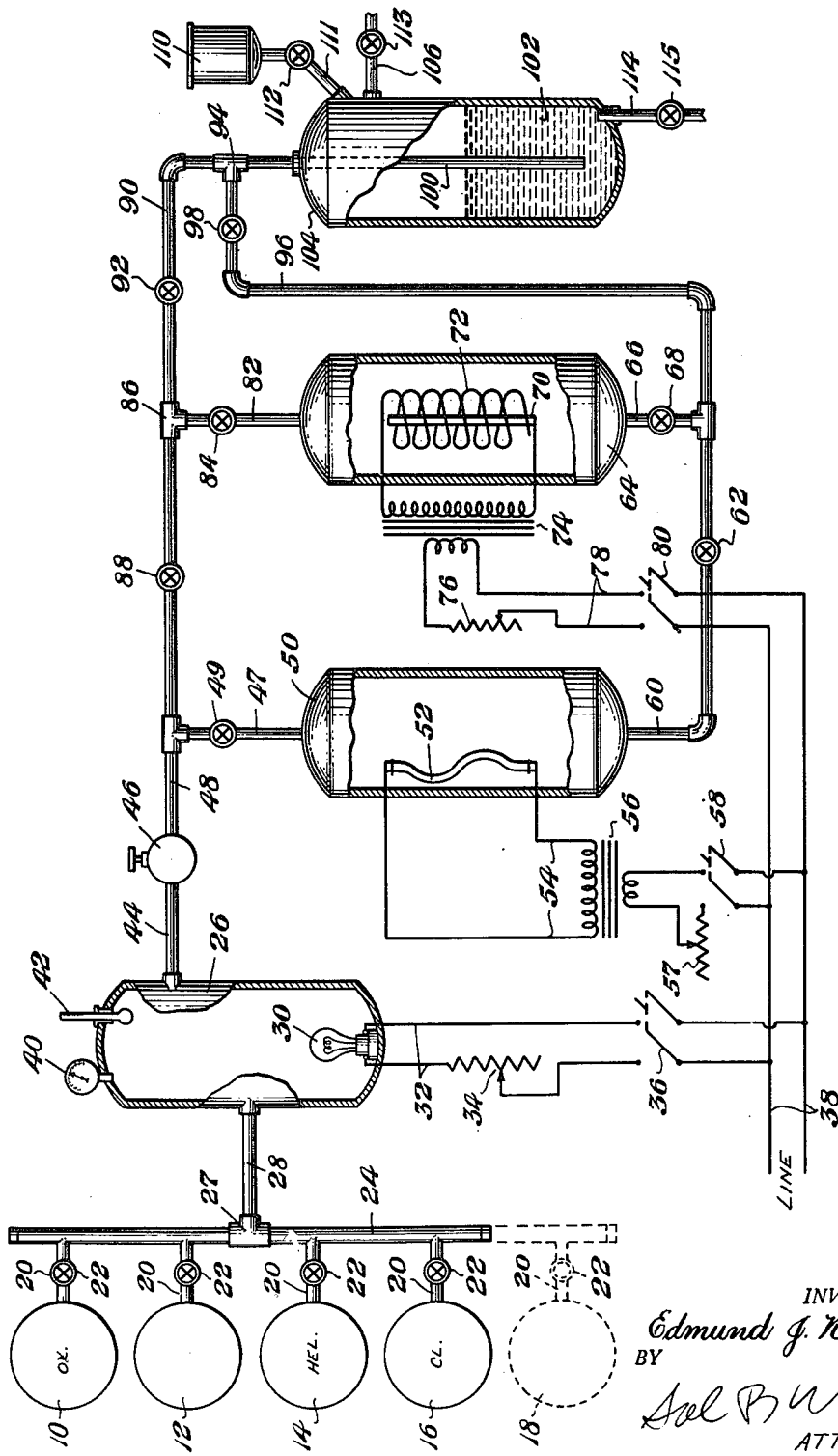
INVENTOR.
Edmund J. Ryan,
BY
ATTORNEY.

Patented May 5, 1953

2,637,688

UNITED STATES PATENT OFFICE 2,637,688

METHOD OF POLYMERIZING OXYGEN

Edmund J. Ryan, Miami, Fla.

Application February 7, 1950, Serial No. 142,831

6 Claims. (Cl. 204—157)

This invention relates to activation of gases and the normally gaseous products formed thereby.

In my parent application, Serial No. 50,199 filed September 20, 1948, of which the present application is a continuation in part, I have described the activation of several gases, particularly oxygen and combinations thereof with other gases such as halogen or inert gases such as helium, by subjecting the same to unusual conditions of exposure to radiant energy, such as ultra violet light in the range of 2,000 to 4,800 angstrom units and a high voltage discharge in the range of 11,000 to 18,000 while maintaining the gas at raised temperatures and pressures of 100° to 200° F. and 10 to 50 lbs. gauge respectively, after which the gas may be further catalytically treated by passing through a catalyst such as sea water. The gases obtained thereby are activated and appear to be more reactive in their known reactions probably due to formation of higher polymers of such gases and further the contact with the sea water may impart trace quantities of halogen gas.

I have found that the gases subjected in sequence and at raised temperatures and pressures first, to ultra violet light irradiation and then to a high voltage treatment consisting of a corona discharge in the preferred high voltage range of 11,000 to 18,000 and sometimes higher, for example at voltages ranging from 5,000 to 50,000, gives substantial polymerization of the gas. In the general prior art practices the ozonization of air seldom produces an ozone content exceeding 2%. The gas oxygen, treated according to the present method, is converted to a high concentration of oxygen polymers. Moreover, such polymerization while containing substantial quantities of $O_3$ appear to contain higher polymers of oxygen than $O_3$.

As further disclosed in my parent application the gas may be given a final catalytic treatment by passing the same through a liquid catalyst comprising a dilute salt solution such as sea water. Such treatment appears to enhance the polymerization and the activity of the gas as an oxidizing agent. And, though a trace quantity of halogen may be present in the gas due to oxidation of halogen salts in the water no free halogen as such is found in the gas, although unanalyzed trace quantities may be present either free or combined. Such gas is a powerful oxidizing agent and shows far greater activity than oxygen or ozone obtainable by heretofore known methods.

I have further found according to the present invention that such gas can be more highly activated, probably by a higher degree of polymerization and, in part, by imparting a substantial but minor halogen content thereto, such as from .1 to 25% by varying more widely the conditions of polymerization and increasing the halogen content either by addition of halogen to the gas while it is being subjected to radiant energy and high voltage discharge under heat and pressure or by increasing the halogen content of the final catalytic contact solution and by both.

The activated oxygen containing gases hereof, when more highly activated by having a positive halogen content provide a wider field of utility by reason of greater activity. Thus, for example the gas oxygen, in more highly polymeric form and activated by a content of halogen, becomes a more active oxidizing agent.

I am not aware at this time as to the exact nature of the reactions which take place in the several stages of treatment but it appears that the gas after subjecting to ultra violet light and high voltage discharge at raised temperatures and pressures appears to contain heretofore unrecognized higher polymers and possibly reaction products thereof with halogen, when halogen is present.

As described in my parent application gas after polymerization by ultra violet light and high voltage discharge may be given a final catalytic treatment with an aqueous solution containing halogen salts in minor proportions as well as suspended free halogen. Such solutions as described therein for catalyst treatment were substantially dilute containing no more than about 3% of salt as will be normal in ordinary sea water. The gas so treated contains traces, if any, of halogen, the effect of such treatment being to more highly activate the gas. When treated however, with a more concentrated halogen solution as described hereinbelow a substantial halogen content is imparted to the gas whether or not halogen is initially present during the polymerization.

In accordance with the present invention oxygen gas alone, or mixed with a generally inert type gas such as helium, or an activating gas such as chlorine, fluorine, bromine or fine suspensions of vaporized iodine, is first preheated to a temperature exceeding 100° F., generally 100° to 300° F. However, the higher temperature appears to tend to a higher degree of polymerization for gases other than oxygen so that temperatures as high as 800° F. may be used in some instances, operation in the range of 100° to 300° F. for any of the gases being most practical.

The activation of the gas in the several stages of treatment herein is carried out at raised pressures, such raised pressures at least as high as 10 lbs. gauge in the apparatus shown will produce some activation. A pressure of from 10 to 100 lbs. gauge is practical for small quantity installations of moderate size to produce gas of moderate activity, and for larger installations where higher pressures are tolerable by the construction thereof, higher pressures may be used and pressures such as about 1,000 lbs. per sq. in. are a practical limit. It will be understood that higher polymers tend to be more readily formed at higher pressures so that pressures in the range of 10 lbs. to 10,000 atmospheres or higher may be used in apparatus constructed sufficiently rugged to withstand such pressures.

In the first stage the gas, as pointed out in my parent application is subjected to ultra violet light. The light is generated preferably in the ultra violet wave length higher than 2000 and I have found that ultra violet light in the range of 2300 to 2900 angstrom units is preferable but for certain oxygen gas mixtures the wave length may range up to 4800. The gas is then passed under these high temperature and pressure conditions in contact with a high voltage corona discharge. Some polymerization is effected at a voltage discharge as low as 5,000 volts, and higher voltages tend to increase the degree of polymerization, but I prefer as a practical operating range a voltage discharge from 11,000 to 50,000 volts but considerably higher voltages may be used. The current used may be direct or alternating and is held low enough to prevent sparking, a current of 1 to 10 amperes being usually applied.

The gas as obtained from the high voltage discharge stage is activated and shows distinct properties as compared to the gas originally supplied to the apparatus. However, considerably greater activity is imparted to gas at this stage if the oxygen gas is simultaneously passed through the apparatus mixed with halogen. The quantity of halogen put through the apparatus together with oxygen gas to be activated will vary with the degree of activity to be imparted as well as the use of the gas. Where a large excess of halogen is undesirable in view of the proposed use of the gas, no halogen will be supplied initially in the early stages of treatment of the gas. Where such halogen is used it will be supplied in desired quantity ranging from a trace up to 25% of the gas being polymerized by the ultra violet and high voltage discharge treatments. As indicated the gas evolved from the high voltage treatment has substantial activity, probably due to substantial polymerization having taken place and is useful in this state as an activated or halogen activated gas.

The following table sets forth preferred operating ranges for particular gases:

It is found, that a final catalytic treatment with an aqueous halogen solution increases the degree of activation and possibly changes the degree of polymerization. It is probable that where the aqueous halogen containing solution is a dilute solution of halogen, very little if any halogen is added to the gas and the action may be a mere change in the degree of polymerization. However, where the aqueous solution is saturated with respect to elemental halogen or a salt thereof a positive content of halogen is imparted to the gas which is slightly variable with the degree of oxidation of the halogen salt, if such is used. While it is noted that a concentrated aqueous solution of halogen catalyst does impart a positive halogen content to the gas, such halogen may be present as a halogenated product of the polymer, free halogen or polymerized halogen, the exact character of the halogen being unknown.

Thus as the catalytic solutions with which the gas may be continuously treated after substantial polymerization in earlier stages, I use a dilute solution of halogen in water, where a lesser degree of activity is to be imparted and in which not more than trace quantities of halogen, if any, would appear in the gas. Such dilute solution may be an aqueous solution of 1 to 4% of elemental halogen or a water soluble salt thereof dissolved in water. Where a positive halogen content is to be imparted to the gas the aqueous solution will contain at least 25% and preferably will be completely saturated with elemental halogen or a water soluble salt thereof, based on the quantity in which the particular halogen will dissolve in the water. Preferably for imparting a halogen content a fully saturated solution is used and even an excess of the salt or elemental halogen which may be under pressure is suspended in the solution to obtain a complete saturation or super saturation of the solution with the halogen material.

The aqueous halogen containing catalyst consists of a solution in water of halogen either as pure elemental halogen dissolved in water, or a water soluble inorganic halogen salt dissolved in water. The halogen may be either elemental halogen or soluble inorganic salts thereof, such as sodium, potassium, lithium, magnesium, barium, strontium or calcium, halides, halates, halites, hypo-halites, or oxy-halides. Specific examples of an inorganic halogen salt or element are sodium chloride, sodium bromide, sodium fluoride, sodium iodide, free elemental iodine, free elemental chlorine, free elemental bromine, free elemental fluorine, sodium hypo-iodite, sodium hypo-fluorite, potassium tri-iodide, potassium hypo-chlorite, potassium bromate, sodium periodate, sodium acid fluoride, lithium periodate, sodium hypo-chlorite, chlorine di-oxide, calcium iodide, barium chloride, strontium chlorate or magnesium chloride. Mixtures of such halogen materials in many instances are desirably used.

Other substantially inert salts may be used in

| Pressure, lbs. gauge | Temperature, ° F. | Light, Angstrom Units | Discharge Volts |
|---|---|---|---|
| Oxygen: | | | |
| Practical Oper. Range 10–1,000 | 10–300 | 2,300–2,900 | 5,000–50,000 |
| Preferred Oper. Range 10–40 | 100–175 | 2,300–2,900 | 14,000–50,000 |
| Oxygen and Helium: | | | |
| Practical Oper. Range 10–1,000 | 100–300 | 2,300–2,900 | 5,000–50,000 |
| Preferred Oper. Range 10–40 | 100–175 | 2,300–2,900 | 14,000–16,000 |
| Oxygen, 90%, and Chlorine, 10%: | | | |
| Practical Oper. Range 10–1,000 | 100–300 | 2,300–2,900 | 5,000–50,000 |
| Preferred Oper. Range 10–600 | 100–175 | 2,300–2,900 | 14,000–16,000 | the catalyst solution primarily to raise the gravity of the halogen containing liquid to give optimum washing contact with the gas polymer passed therethrough and also to give improved solubility effects of the halogen. Such inert salts as the soluble sulphates are suitable and the liquid in which the halogen is dissolved may be such as already have a natural halogen content as well as lesser quantities of other salts, for example natural halogen-containing brines including ordinary sea water.

It will be understood that sea water when used will either be further fortified with the halogen to substantial saturation for maximum activity or used without further halogen addition where ordinary activity is desired. Such quantity as normally contained in sea water, about 2½ to 3% suffices for activating the gas without imparting a substantial halogen content thereto. However, for purposes of more highly activating the gas and to impart halogen thereto sea water may be used as a base liquid for further saturation with the halogen material.

The through-put of the gas is variable with the size of the apparatus and the degree of polymerization to be effected. For example in an apparatus wherein each of the units has the capacity of about one cubic foot, the gas will be passed therethrough at a rate of from about .25 to 15 liters of gas at which rate it is also bubbled through a liter of liquid catalyst.

For further description of the production of active gas reference is made to the drawings herewith:

The single figure shows a supply of gas in one or more individual containers, 10, 12, 14, 16 and 18 labeled therein oxygen, helium, chlorine or other halogen gas. The gases mentioned above to be treated will be supplied from one of such containers through a line 20, controlled by valves 22 to a manifold 24 which joins by a T 27 into a common outlet pipe line 28 where gases either singly or in admixture may be supplied to a suitable heating unit 30 which may be a source of infra-red rays for heating, contained in a pressure resistant receptacle 26. The infra-red ray lamp 30 is heated by a suitable electrical circuit supplied from a main line 33 through a switch 36 and lines 32 controlled in quantity by a rheostat 34. The preheating chamber 26 is supplied with a pressure gauge 40 and thermometer 42 for adequate control of the pressure and temperature of the gases passed therethrough. The receptacle 26 discharges gas through a pipe line 44 having suitably mounted therein a pressure regulating valve 46 for further control of the pressure supplied to the pipe line 48 for further treatment.

The gas as controlled by valve 49 is lead through a pipe line 47 into a pressure resistant chamber 50 wherein are mounted one or more sources of ultra violet light 52 energized through electrical conduits 54 in circuit with the secondary of a transformer 56 whose primary side is electrically activated through rheostat 57 and a switch 58 conducting electrical current from the supply lines 38. The gas from the ultra violet light treating chamber 50 discharges through the pipe line 60 controlled by valve 62 and thence is supplied through a line 66 controlled by a valve 68 to a high voltage discharge chamber 64. The high voltage discharge is effected as the corona type through several electrodes 70 and 72 illustrated diagrammatically as connected to the secondary of a transformer 74. The primary side is activated by current flowing through lines 78 controlled by rheostat 76 and switch 80 connected to power in lines 38. The upper end of the receptacle 64 is provided with a pipe line 82 controlled by valve 84 terminating in a T fitting 86 which can communicate with the fluid container 48 by opening valve 88 and with a pipe line 90 by opening intermediate valve 92 therein.

The fluid container 90 contains a T fitting 94 providing branch line 96 containing valve 98 through which fluid can be received from ultra violet light chamber 50 and/or electrical discharge chamber 64 by suitable manipulation of their valves 62 and 68 respectively. Similarly, by closure of valve 49 and opening valve 88, gas from line 48 may be passed directly to a high voltage discharge chamber 64 and thence into line 96, thus by-passing the ultra violet light chamber. Gas from either or preferably both of the fluid containers 90 or 96 passing through the T fitting 94 is then directed through a pipe 100 submerged in liquid catalyst solution 102 maintained at a level sufficient to allow bubbling contact of the gas passed through pipe 100. The gas is then emitted through pipe 106 as activated gas hereof suitably controlled by valve 113 which may be of the pressure reducing type. The catalyst is supplied to tank 102 by being first mixed as a solution or slurry in a small mixing tank 110 and thence passed into the catalyst tank through pipe 111 controlled by valve 112. The catalyst tank 102 also has fitted in the bottom thereof the drain pipe 114 controlled by valve 115. As thus shown, any of the several gases or mixtures thereof may be first preheated and supplied under suitable pressure to a source of ultra violet light and then to a high voltage discharge or either of them and finally to contact while under pressure with an aqueous catalyst.

As disclosed herein when the temperature range is below the boiling point of water the catalyst solvent normally is not subject to substantial vaporization. When the gas is heated above the boiling point of the catalyst solvent, the catalyst tank 102 may be jacketed for maintaining the temperature below the boiling point by passing cooling water around the catalyst tank. As described herein the gas after polymerization may often be directly used without further catalytic contact, in which case the catalyst chamber may be omitted entirely or the apparatus as shown may be used with the modification that no catalyst will be placed in the tank 102.

The following examples illustrate the practice of this invention:

*Example I.*—Oxygen obtained from a tank of pure compressed oxygen is passed at the rate of 1½ liters per minute through a preheating chamber wherein it is heated to 150° F. and thence to a chamber of approximately 1 cu. ft. content containing a bank of ultra violet lamps radiating light at 2450 angstrom units and at a pressure of 45 lbs. gauge. It was then passed through a high voltage corona discharge unit mounted in a pressure type tank as shown in the drawings herewith, maintained at a voltage discharge of 15,000 volts, the arrangement of the apparatus being such that the gases pass over the surface of the highly charged light emanating and electrical discharging units. This gas obviously contains polymers at least as high as $O_3$ but may contain substantial quantities of other polymers.

*Example II.*—Oxygen is passed from a pure oxygen tank at a temperature of 100° F. and a pressure of 40 lbs. gauge through the ultra violet light chamber of the drawing herewith emitting light at wave length of 2500 angstrom units and thence through a high voltage corona discharge maintained at a discharge voltage of 15,000 volts and then bubbled through a catalyst consisting of ordinary sea water containing 3% of salt, ordinary sodium chloride and other constituent salts normally present in sea water. In the apparatus used the treating chambers had a capacity each of about 1 cu. ft. and the gas was passed therethrough at a rate of 1½ liters per minute. The gas evolved was an activated oxygen gas having a characteristic odor totally distinct from ozone, the gas easily supported combustion, the gas could be liquified under pressure and showed various evidences of activity higher than the original oxygen. An absorption band spectra of the gas showed absorptions in the range of 3400 to 3500 angstrom units indicating that the gas contained components other than ozone or pure oxygen.

*Example III.*—Oxygen gas as in Example II was passed through the apparatus under the same conditions at a rate of 1½ liters per minute and finally through a catalyst which was a saturated solution of sodium hypochlorite in sea water. This gas had a slightly more pungent odor and also showed an absorption band absorption in the range of 3400 to 3500 angstrom units and combination tests showed presence of a slight quantity of halogen which is probably present as a chlorine oxide. The gas is so highly activated that it very rapidly supports combustion, for example steel wire wool burns completely and almost explosively in an atmosphere of this gas.

*Example IV.*—In another experiment exactly along the lines of Example III a saturated solution of sodium chloride in sea water was substituted as the catalyst and the gas presumably containing a trace of free or combined fluorine supported the combustion of ordinary glass. The gas of these examples has a characteristic odor completely distinct from either halogen or ozone.

*Example V.*—Oxygen gas as in Example II was mixed with a helium gas and passed through the apparatus and thence through a catalyst comprising ordinary sea water. The gas had the same characteristic odor as the gas of Example I and was more highly activated than ordinary air.

*Example VI.*—A mixture of oxygen with 10% chlorine by volume was passed through the apparatus, at a pressure of 500 lbs. per square inch, gauge, at a temperature of 200° F. being first subjected to ultra violet light at a wave length of 2500 angstrom units and then through a high voltage discharge maintained at 100,000 volts. The gas was found to be more active in typical oxidation reaction than either chlorine or ozone.

*Example VII.*—A gas prepared as in Example VI except that the catalyst was concentrated sea water solution of sodium fluoride was found to easily burn glass and showed other evidence of being an extremely active oxidizing agent.

The gas hereof with the increased activity and apparent content of higher polymeric forms activated in some cases to a greater or lesser degree by a halogen content improves the utility of these gases alone or admixed.

Various modifications will occur to those skilled in the art and it is intended that the examples set forth be regarded as exemplary and not limiting except as defined in the claims appended hereto.

I claim:
1. The method of polymerizing oxygen gas comprising preheating the gas to a temperature in the range of 100 to 800° F. and compressing the gas to a pressure in the range of 10 to 100 lbs. per sq. in. gauge, irradiating the gas with ultra violet light in the wave length of 2,000 to 4,800 A. U. while maintaining said temperature and pressure and then subjecting the gas under the same conditions of temperature and pressure to a high voltage corona discharge in the range of 11,000 to 18,000 volts.

2. The method as defined in claim 1 wherein the oxygen gas is mixed with an inert gas prior to polymerizing the same.

3. The method as defined in claim 1 wherein the oxygen gas is mixed with halogen prior to polymerizing the same.

4. The method as defined in claim 1 wherein the polymerized oxygen containing gas is further treated by passing the same through an aqueous solution of a halogen substance selected from the group consisting of elementary halogen and water soluble halogen salts.

5. The method as defined in claim 1 wherein the polymerized oxygen containing gas is passed through a dilute aqueous solution of a halogen substance selected from the group consisting of elementary halogen and water soluble halogen salts.

6. The method as defined in claim 1 wherein the polymerized oxygen containing gas is passed through a concentrated aqueous solution of a halogen substance selected from the group consisting of elementary halogen and water soluble halogen salts.

EDMUND J. RYAN.

References Cited in the file of this patent

UNITED STATES PATENTS

| Number | Name | Date |
|---|---|---|
| 450,404 | Dittrich | Apr. 14, 1891 |
| 829,875 | Lovejoy | Aug. 28, 1906 |
| 2,134,206 | Roberts | Oct. 25, 1938 |

OTHER REFERENCES

Vosmaer, "Ozone," 1916, pp. 2, 3, 4 and 6.